(12) United States Patent
Bhatt

(10) Patent No.: US 9,215,332 B2
(45) Date of Patent: Dec. 15, 2015

(54) BUDDY LIST FOR BLOCKED SERVICE

(75) Inventor: Kavita Bhatt, Bangalore (IN)

(73) Assignee: ACCENTURE GLOBAL SERVICES LIMITED, Dublin (IE)

(*) Notice: Subject to any disclaimer, the term of this patent is extended or adjusted under 35 U.S.C. 154(b) by 243 days.

(21) Appl. No.: 12/992,991

(22) PCT Filed: Aug. 26, 2009

(86) PCT No.: PCT/IB2009/006828
§ 371 (c)(1),
(2), (4) Date: Nov. 16, 2010

(87) PCT Pub. No.: WO2010/023552
PCT Pub. Date: Mar. 4, 2010

(65) Prior Publication Data
US 2011/0071930 A1 Mar. 24, 2011

(30) Foreign Application Priority Data
Aug. 29, 2008 (IN) .......................... 1830/MUM/2008

(51) Int. Cl.
| | |
|---|---|
| *H04M 1/00* | (2006.01) |
| *H04M 15/00* | (2006.01) |
| *G06Q 20/22* | (2012.01) |
| *G06Q 20/32* | (2012.01) |
| *H04M 15/08* | (2006.01) |
| *H04M 17/00* | (2006.01) |

(Continued)

(52) U.S. Cl.
CPC .............. *H04M 15/00* (2013.01); *G06Q 20/227* (2013.01); *G06Q 20/32* (2013.01); *G06Q 40/12* (2013.01); *H04M 15/08* (2013.01); *H04M 15/09* (2013.01); *H04M 15/765* (2013.01); *H04M 17/20* (2013.01); *H04L 67/306* (2013.01); *H04M 2215/62* (2013.01); *H04M 2215/66* (2013.01); *H04M 2215/724* (2013.01)

(58) Field of Classification Search
CPC ........................................................ H04M 15/00
See application file for complete search history.

(56) References Cited

U.S. PATENT DOCUMENTS

| | | |
|---|---|---|
| 5,774,533 A | 6/1998 | Patel |
| 5,805,680 A | 9/1998 | Penzias |
| 6,169,891 B1 | 1/2001 | Gorham et al. |

(Continued)

FOREIGN PATENT DOCUMENTS

| | | | | |
|---|---|---|---|---|
| CA | 2305065 | * | 4/1999 | ............ H04M 15/00 |
| CA | 2305065 | * | 10/2000 | ............ H04M 15/00 |

(Continued)

OTHER PUBLICATIONS

CNET, Ask the Cell Phone Diva: Faceplates and family plans. Joni Blecher, Sep. 10, 2004.*

(Continued)

*Primary Examiner* — Ig T An
*Assistant Examiner* — Michael Maicher
(74) *Attorney, Agent, or Firm* — Mannava & Kang, P.C.

(57) ABSTRACT

A buddy list is used to provide a service to a user if the service is blocked. A user may store multiple profiles in a user device, and each profile identifies a different buddy list. If the user's service is blocked, the user device is configured to retrieve a profile and send a request to use a buddy list from the profile to utilize the service. If a request is rejected, another profile is tried until the request is approved or until all the profiles have been exhausted.

16 Claims, 8 Drawing Sheets

(51) Int. Cl.
  *G06Q 40/00* (2012.01)
  *H04L 29/08* (2006.01)

(56) References Cited

U.S. PATENT DOCUMENTS

| | | | |
|---|---|---|---|
| 6,304,641 | B1 | 10/2001 | Culli et al. |
| 6,453,031 | B2 | 9/2002 | Malik |
| 6,850,756 | B2 | 2/2005 | Berg et al. |
| 6,977,998 | B2 | 12/2005 | Brown et al. |
| 6,987,844 | B2 * | 1/2006 | Himmel et al. ............ 379/114.2 |
| 7,042,994 | B2 | 5/2006 | Hanna et al. |
| 7,043,226 | B2 * | 5/2006 | Yamauchi .................... 455/405 |
| 7,092,385 | B2 | 8/2006 | Gallant et al. |
| 7,958,022 | B2 * | 6/2011 | Goyal et al. .................... 705/30 |
| 2003/0076940 | A1 | 4/2003 | Manto |
| 2004/0042597 | A1 | 3/2004 | Atkins et al. |
| 2004/0058670 | A1 | 3/2004 | Pohutsky et al. |
| 2005/0013423 | A1 | 1/2005 | Eversen et al. |
| 2005/0107114 | A1 * | 5/2005 | Ocock ........................ 455/550.1 |
| 2005/0113073 | A1 | 5/2005 | Bayne |
| 2007/0021102 | A1 * | 1/2007 | Sherman ....................... 455/408 |
| 2007/0172039 | A1 | 7/2007 | Mendiola et al. |
| 2007/0259663 | A1 | 11/2007 | Weintraub et al. |

FOREIGN PATENT DOCUMENTS

| | | |
|---|---|---|
| EP | 1049314 A1 | 11/2000 |
| EP | 1871074 A1 | 12/2007 |
| WO | 03/019845 A2 | 3/2003 |

OTHER PUBLICATIONS

CNET, Ask the Cell Phone Plan Diva: Faceplates and fmaily plans. Joni Blecher, Sep. 10, 2004.*

International Search Report and Written Opinion for Application No. PCT/IB2009/006828, May 19, 2010.

"Vodafone Egypt", OGM Presentation, Hilton-Oct. 6 City, Jan. 31, 2005, 14 pages, downloaded on Jun. 4, 2008.

"Credit Me/ Credit You", Digicel Barbados, http://www.digicelbarbados.com/en/help_faqs/cmcy, downloaded date Nov. 3, 2014, 7 pages.

"Money Transfer using SMS, Mobile payment", VIPNET, http://www.vipnet.hr/ko/usluge/mobilno-placanje, downloaded date Nov. 4, 2014, 2 pages.

* cited by examiner

BUDDY LIST FOR BLOCKED SERVICE

The present application is a national stage filing under 35 U.S.C. 371 of PCT application number PCT/IB2009/006828, having an international filing date of Aug. 26, 2009, which claims priority to Indian application number 1830/MUM/2008, filed on Aug. 29, 2008, both of which are incorporated by reference in its entirety.

BACKGROUND

Cellular phones and telephony services in general are ubiquitous in today's world. This is especially true with regard to third world countries emerging into economic super powers, such as India and China, where cellular phones are used by everyone from rikisha drivers to CEOs. In these countries, cellular phone service is the primary telephone service for many users, because cellular phone service is affordable and in many cases provides better service than landline service. In some situations, whether the consumer is in a third world country or not, affordability is made possible by prepaid cellular service. Prepaid service may be provided through SIM cards with a predetermined number of minutes. A SIM card may be purchased and put into the cellular phone to provide talk time. Go-phones are also popular and affordable. These typically include low-cost cellular phones with a prepaid amount of service available. Of course, cellular service providers may provide call plans where the user is billed monthly and given a predetermined number of minutes each month. However, call plans tend to be costly.

Even with cellular phone service being made affordable, there may be situations when a user does not have any minutes to make a call, or their service was discontinued for lack of payment. The user may be in a situation where they are unable to contact the service provider to renew service or purchase a prepaid SIM card. If the user has a friend or buddy with him having a working cellular phone, the user may borrow his friend's phone to make a call. However, if none of the user's friends are around, the user would likely be unable to make a call. Even if it is an emergency situation, where the user needs to contact a family member or other person, the user's call may be blocked by the service provider.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a buddy list may be used to utilize a service, such as cellular service or other service, when the service would otherwise be blocked. The buddy list includes information used by another to utilize a service. The information may identify a friend or other user with a valid account to use a service, and another user attempting to use the service uses the friend's account to use the service. For example, the buddy list may enable a user to send and receive calls through a friend's account even if the user's own service is blocked by the service provider due to lack of minutes, lack of payment, or for some other reason. In general, the buddy list enables a user to piggy-back off the service of a second user for making and receiving calls or for using another service, such as short messaging service (SMS) (text messaging), and multimedia messaging service (MMS), or data/Internet service.

Figure 1:
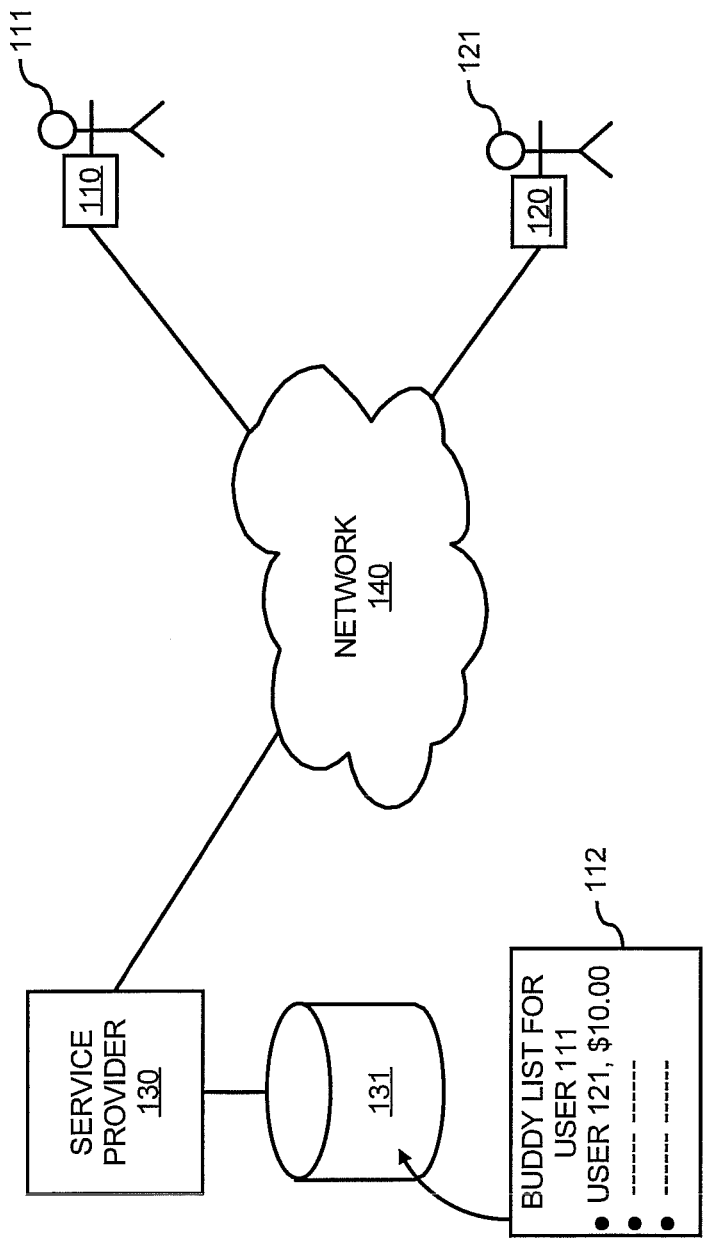
FIG. 1 illustrates a system, according to an embodiment.

FIG. 1 illustrates a system 100, according to an embodiment. The system 100 includes user device 110, user device 120, service provider 130 and network 140. The user devices 110 and 120 use services provided by service provider 130. For example, the service provider 130 may be a cellular service provider providing voice, Internet and SMS service to clients, such as the user devices 110 and 120. The service provider 130 may include one or more servers providing service functions. The service provider 130 also includes a database 131 including user information and buddy lists. The user devices 110 and 120 may be cellular phones, personal digital systems, personal computers, such as laptops, or other types of user devices. The network 140 may include one or more of an access network, cellular network, public packet-switched network, such as the Internet, etc. It will be apparent to one of ordinary skill in the art the system 100 may include many more service providers, networks and user devices than shown.

User 111 having user device 110 has a buddy list 112, which is shown as stored in the database 131 of the service provider 130. The buddy list 112 is stored at the service provider 130 in this embodiment, but it will be apparent to one of ordinary skill in the art that the buddy list may be stored at other locations, including the user device. The buddy list 112 identifies other users, for example, by telephone number or some other unique ID, and a reserve amount for each of the other users. The reserve amount represents the amount of service that is available to each of the other users on the buddy list. For example, the service is a cellular phone service, and the reserve amount is a monetary amount that is depleted based on the number of minutes used by the particular user on the buddy list.

In the example of the buddy list 112, the user 121 of the user device is listed on the buddy list 112 of the user 111. The reserve amount is $10.00. Through a registration process, users may register with the service provider 130 to be able to utilize a buddy list. Also, users may create and modify their own buddy lists, which includes adding and removing users from their buddy lists or modifying reserve amounts. A registration process is described in further detail below.

Given the example of the buddy list 112, assume the cellular service for the user 121 is blocked by the service provider 130, and thus the user 121 is unable to make or receive a call using their telephone number registered with the service provider. The cellular service may be blocked for lack of payment, lack of renewal, lack of minutes, etc. The user 121, however, desires to make a cellular call using the user device 120. Assuming the call could have been made but for the blocking of the service by the service provider 130, the user 121 may make the call using the buddy list 112 and the cellular service of the user 111. To make the call using the buddy list 112, the user 121 identifies to the service provider 130 that the call is a buddy list call. The user 121 also provides the identity of the user 111 owning the buddy list 112. In one example, the user 121 may dial a specific code, the user's ID and password, and the telephone number of the user 111. The service provider 130 identifies from the code that this is a buddy list call, and the service provider 130 identifies the buddy list 112 from the telephone number. The service provider 130 gives notification that the call can be made to the device 120 of the user 121. The user 121 then is allowed to make the call, and the reserve amount for the user 121 on the buddy list 112 is depleted according to the amount of use.

Figure 2A:
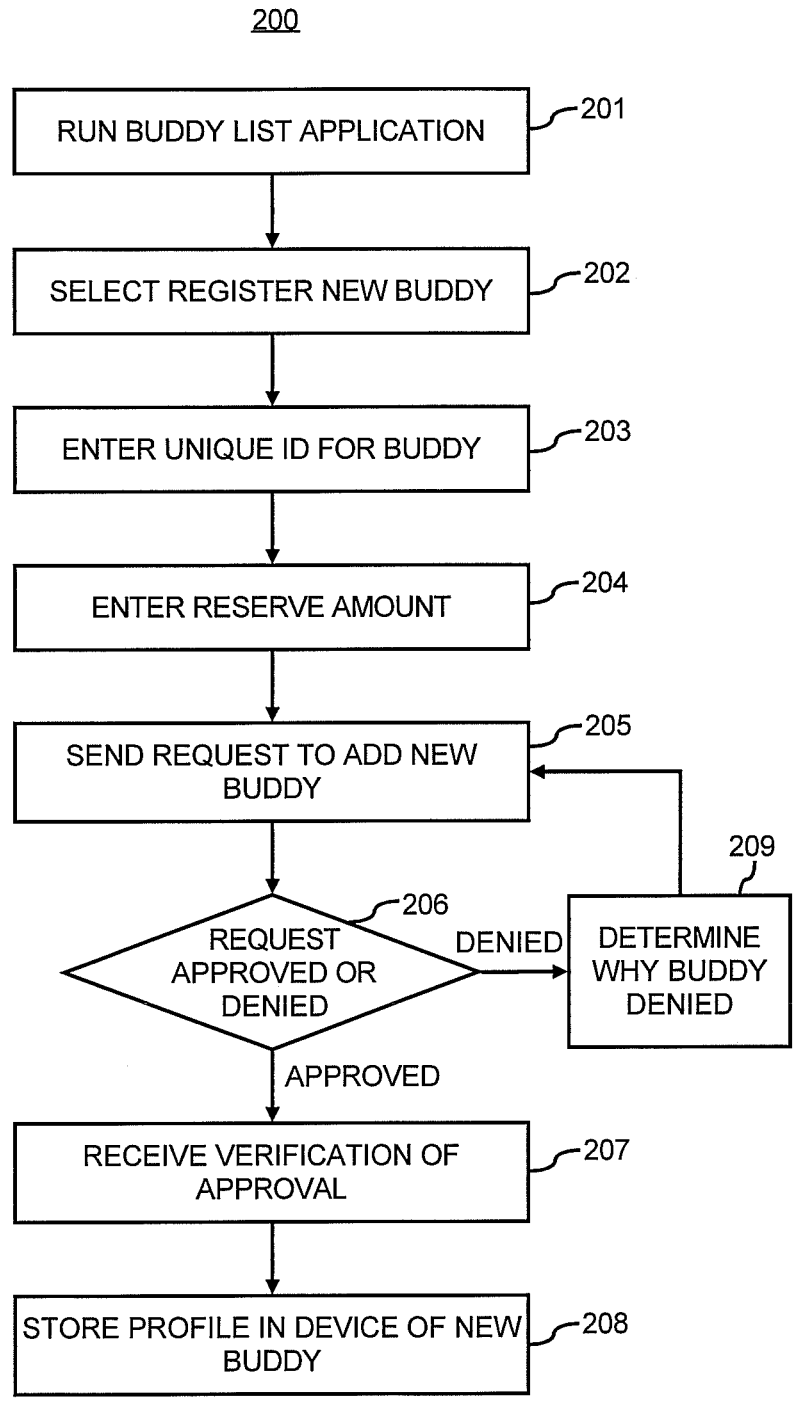
FIGS. 2A-B illustrate methods for registering a new buddy, according to embodiments.
Figure 2B:
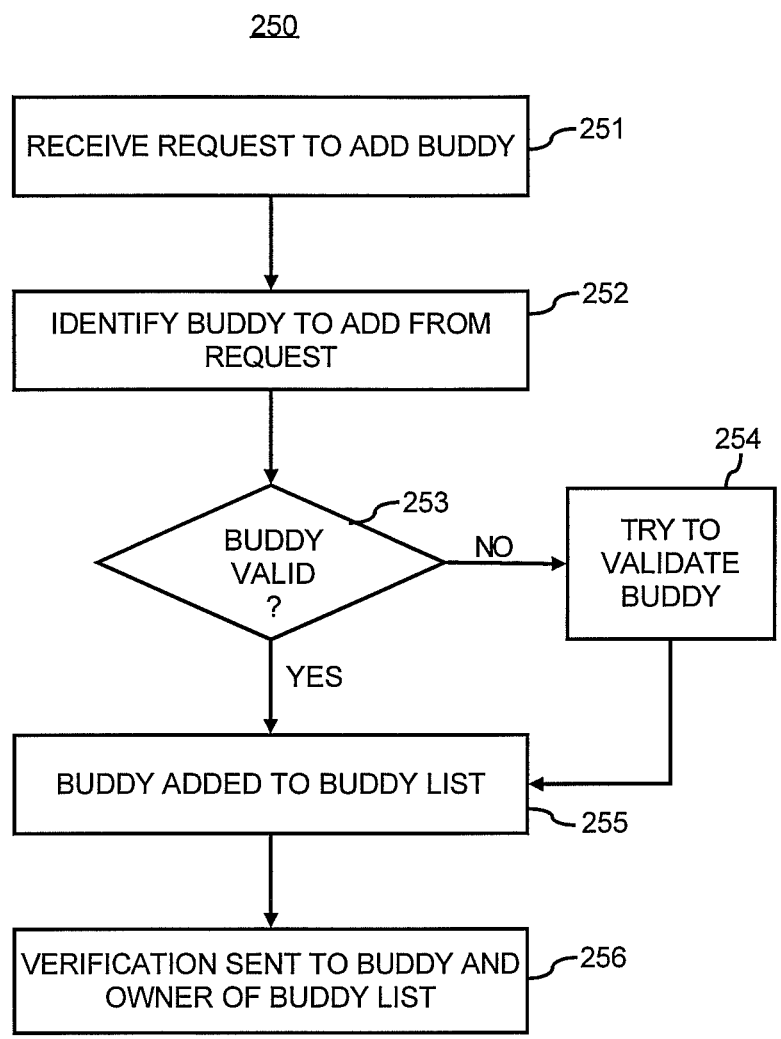

FIGS. 2A-B illustrate flow charts for client-side and server-side registration for the buddy list, according to embodiments. The methods may be used in conjunction with each other and other methods described herein. The methods are described with respect to one or more of FIGS. 1-3 by way of example and not limitation. The methods may be performed in other systems.

FIG. 2A shows a client-side registration process 200. At step 201, the a buddy registration application is invoked on the user device. For example, the user 111 runs a software application on the user device 110 for creating and modifying the buddy list 112. The buddy list application is described in further detail with respect to FIG. 3. This may be an application provided by the service provider 130 or a third party. The application may be executed by the user selecting a buddy list option from a menu or selecting an icon for the application. The application may include modules running continuously in the background.

Assuming the buddy list is already created and the user wants to add a buddy to the list, the user selects an option for adding a new buddy at step 202. This may include one of multiple options provided by the buddy list application for creating or modifying a buddy list.

Prior to adding a new buddy, the service provider may require the buddy and owner of the buddy list to register with the service provider to have the ability to use buddy lists. This may require a service upgrade to an existing user account. The service upgrade may or may not require additional charges for the buddy list service. When registered, the service provider may assign the user an ID and password, which may be needed to use a buddy list or create or modify a buddy list. Also, the ID and password provides additional security against fraud and unauthorized use.

At step 203, the user enters a unique ID for the buddy. For example, the user 111 shown in FIG. 1 wants to add the user 121 to the buddy list 112. The user enters a unique ID, such as the telephone number, for the user 121.

At step 204, the user enters a reserve amount for the user.

At step 205, the user sends a request to the service provider to add the entered user and reserve amount to the buddy list.

At step 206, a determination is made as to whether the request is approved or denied. For example, the service provider 130 may approve or deny the request. Also, an owner of a buddy list may approve or deny a request if a friend of the owner is requesting to be added to the list.

If the request is approved, at step 207, the service provider notifies sends verification of the approval to the owner of the buddy list, such as the user 111, and the added buddy, such as the user 112. The service provider may send verification details to the added buddy, such as ID, password, reserve amount, indication of the user that has added the buddy to their buddy list, etc. This information is used to create profiles at the buddy's user device.

At step 208, the user device of the added buddy stores a profile in their user device identifying the buddy list that the user has been added to and reserve amount. Other details may also be stored in the profile, such as telephone number of the owner of the buddy list. For example, the user device 120 of the user 121 receives notification that they have been added to the buddy list 112 of the user 111. The notification may include registration details, such as identification of the user 111 (e.g., telephone number of the user 111), reserve amount, the ID of the user 121 and password. The user device 120 maintains a local list of all the users that have added the user 121 to their buddy lists. To this local list is added the profile, including the telephone number of the user 111, the reserve amount, and the password. When the user 121 needs to use a buddy list to make a call, this local list is used to identify one or more buddy lists that may be used to make the call.

If at step 206 a determination is made that the request is not approved, the request may be resubmitted after determining why the request was denied and fixing the problem. This is shown as step 209. For example, if the user 121 failed to register for the buddy list service, the request to add the user 121 to the buddy list 112 may be initially denied. After registration, the request may be approved.

The method 200 describes adding a new buddy to a buddy list. Other modifications may be made to the buddy list and notifications and/or verifications of the modifications may be sent to the buddy and/or owner of the buddy list. Other modifications may include removing a buddy or modifying a reserve amount.

The steps of the method 200 describe a user adding a buddy to their buddy list. For example, the method 200 may be used by the user 111 to add the user 121 to their buddy list 112. In one embodiment, the user 111 simply adds the buddy 121 to their list without the user 121 requesting to be added to the buddy list 112. In another embodiment, the user 121 may request to be added to the buddy list of the user 111. In this embodiment, the user 121 sends a request to be added to the buddy list 112 of the user 111, along with a requested reserve amount, to the service provider 130. The service provider 130 verifies with the user 111 that the user 111 approves the addition of the user 121 to their buddy list 112. Then, the service provider 130 sends registration details to the users 111 and 112.

In one embodiment, the user 121 may send a single request to be added to multiple buddy lists to the service provider 130. The request my identify each buddy list by telephone number of the owner of each buddy list. Then, the user device 120 receives and stores registration details for each buddy list that registered the user 121.

FIG. 2B shows a server-side registration process 250. The steps of the process 250 may be performed in conjunction with the steps of the process 200. At step 251, the service provider receives a request to add a user to a buddy list. For example, the service provider 130 receives a request to add the user 121 to the buddy list 112 of the user 111. The request may be sent from the user 121, the owner of the buddy list, or another user. The request indicates a unique ID of the user to be added to the buddy list and a reserve amount. This may include the request sent at step 205 of the method 200.

At step 252, the service provider identifies the buddy to be added from the request. For example, the service provider 130 identifies the telephone number of the user 121 to be added to the buddy list 112 from the request.

At step 253, the service provider determines whether the buddy is valid. For example, the service provider 130 may determine whether the user 121 is registered, whether the user's account is still valid, etc.

At step 254, if the buddy is valid, the buddy is added to the list. For example, the service provider 130 adds the user 121 to the buddy list 112. The reserve amount is also added.

At step 255, verification is sent to the buddy (e.g., user 121) and the owner of the buddy list (e.g., user 111) that the buddy has been added to the buddy list. Details for the profile may be sent with the verification, such as described at step 207. Verification may be sent by SMS text message, email or other means. The steps of the method 250 may be performed for other modifications to the buddy list, such as modifying reserve amounts or deleting users from the buddy list.

If the buddy is not valid, as determined at step 253, then the buddy may try to become validated at step 254. This may include registering the buddy with the buddy list service.

Figure 3:
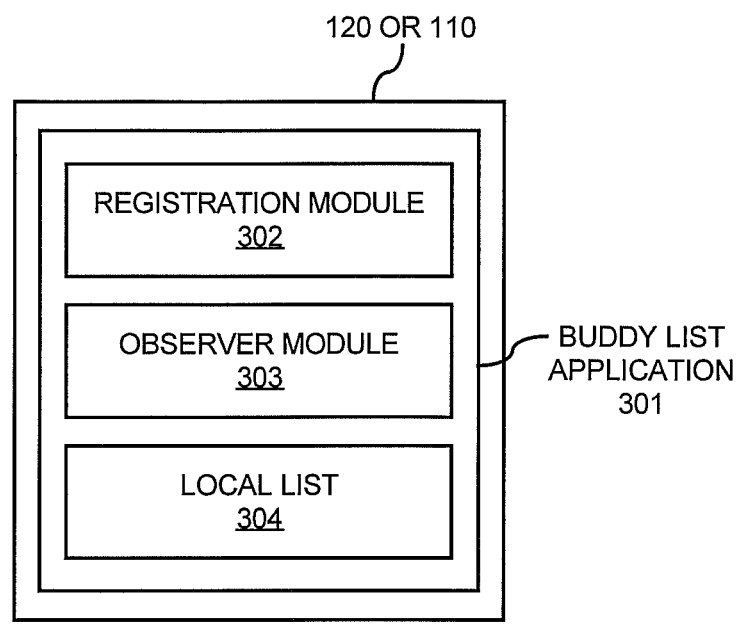
FIG. 3 illustrates a user device, according to an embodiment.

FIG. 3 illustrates modules for a buddy application 301, according to an embodiment. Modules may include software, hardware or a combination of both. The buddy application 301 runs on a user device, such as the user device 120 or the user device 110. The buddy application 301 includes a registration module 302, an observer module 303, and a local list 302. The buddy application 301 is generally described above. The buddy application 301 is invoked or executed to register a user with the buddy list service, create or modify a buddy list, including generating requests to be added to a list, and to use a buddy list to make a call or use another service when the call or service is blocked.

The registration module 302 performs the steps described with respect to the method 200. For example, the registration module 302 is used to create a buddy list, modify a buddy list or to request to be added to a buddy list. The local list 304 identifies all of the other users that have added the user as a buddy. A profile may be stored in the local list for each of the other users having added the user to their buddy list. For example, assume the buddy list application 301 is in the user device 120 used by the user 121 shown in FIG. 1. A profile in the local list 304 identifies the user 111 as having the user 121 on their buddy list. The local list 304 also includes profiles identifying any other users that have added the user 121 as a buddy to their lists. Verifications may be received from the service provider 130 when the user 121 has been added or removed from a buddy list and the verifications may be used to maintain the local list 304. The profiles in the local list 304 may include reserve amounts and other information. The profiles may also include a user ID and/or password, which is sent to the service provider 130 to use a service through a buddy list.

The local list 304 is shown as being included in the buddy list application 301. However, the local list 304 may simply be data stored in non-volatile memory on the user device. The local list 304 may be accessed by the buddy list application 301 when needed.

The buddy list application 301 also includes the observer module 303. The observer module 303 determines when the user device needs the use of a buddy list to utilize a service. For example, the observer module 303 may run in the background of the user device 120. The user device 120 attempts to make a cellular call, but the call is blocked. The observer module 303 identifies that the call is blocked. For example, the user device 120 indicates to a user a call attempt failed and the observer module 303 identifies the failed call attempt message. A flag or one or more bits may be set in the user device 120 when a call attempt fails. This flag or one or more bits may be monitored to determine when a call is blocked or when another service is blocked.

After the observer module 303 identifies a blocked service, the observer module 303 uses the local list 304 to attempt use a buddy list to utilize the service. For example, the local list 304 identifies three users having the user 121 on their buddy lists. The observer module 303 tries to use each buddy list, one-by-one, until verification is received that the call can be made. Then, the call is made using a friend's account with the service provider. In other words, the call is made using the buddy list of the friend. The buddy list identifies the friend's account as a valid account authorized to use the service. Also, the friend's account may be adjusted based on the amount of use, which is reflected by the depletion of the reserve amount.

Figure 4A:
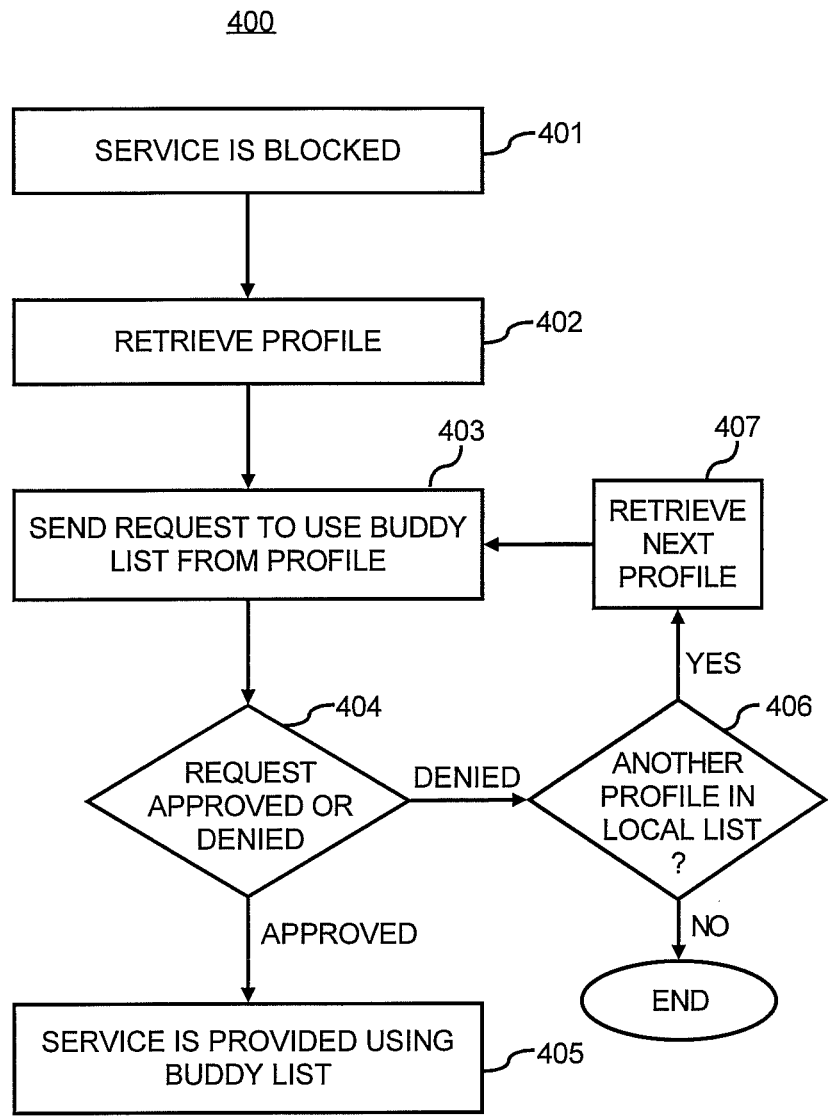
FIGS. 4A-C illustrate methods for using a buddy list to utilize a service, according to embodiments.
Figure 4B:
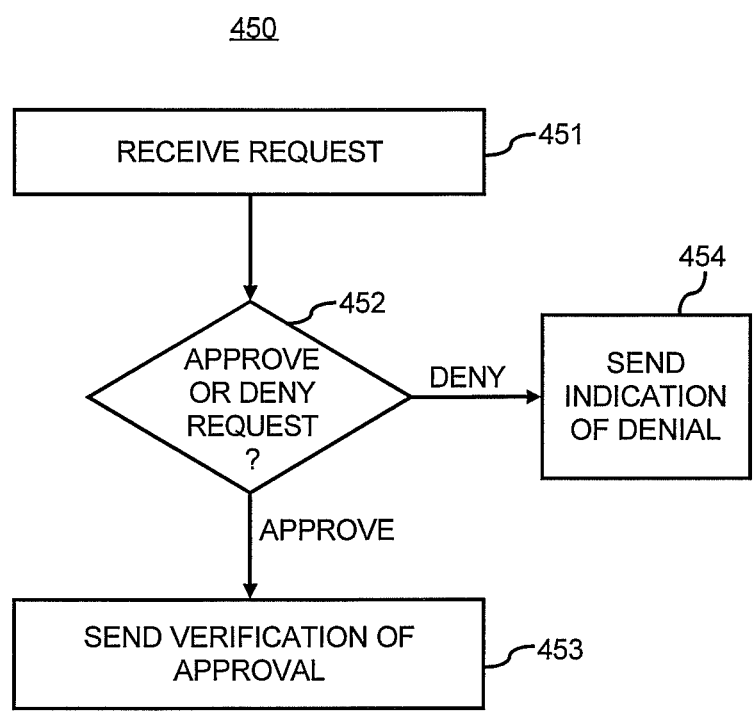

FIGS. 4A-B describe methods for using the buddy list to utilize a service, according to embodiments. The methods may be used in conjunction with each other and other methods described herein. The methods are described with respect to one or more of FIGS. 1-3 by way of example and not limitation. The methods may be performed in other systems.

FIG. 4A describes a method 400 on the client-side for using the buddy list. At step 401, the user device determines whether a service is blocked. For example, the observer module 303 shown in FIG. 3 determines whether a call is blocked. The service provider may block the call for lack of payment, lack of minutes, etc.

In some situations, a blocked call may be the result of lack of signal. For example, if the user device 120 is not within a predetermined distance to a cell tower, no service may be available. In these instances, the buddy list cannot be utilized to utilize the service. In one embodiment, the observer module 303 may identify when these situations occur, so as not to invoke the use of a buddy list. This situations may be identified by monitoring the signal strength.

At step 402, if the service is blocked, a profile from a plurality of profiles is retrieved to determine a buddy list to use. For example, the observer module 303 retrieves a first profile from the local list 304. The profile identifies a buddy list of a particular user, so a request can be sent to the service provider to use that buddy list. In one example, the profile includes <ID><password><friend's number><your number>. In this example, the ID is an ID of the user 121 and a password of the user 121 assuming the user 121 is attempting to make a call from the user device 120 shown in FIG. 1. The ID and password were previously provided to the user 121 when the user 121 first registered with the service provider 130 to be able to use buddy lists. The friend's number is the number of the user 111 having the user 121 on their buddy list. The profile may also include the telephone number of the user 121.

At step 403, the user device sends a request to the service provider to use a buddy list identified from the profile determined at step 402. For example, the observer module 303 sends a request to the service provider 130 with the information in the profile for the user 111. In one embodiment, the user may dial a special code, which notifies the service provider 130 that the user is making a buddy list call. The observer module 303 sends the profile with the call. In another embodiment, the user may simply select an option on a menu provided by the buddy list application 301 shown in FIG. 3, and in response to the selection the observer module 303 sends the request along with the profile to the service provider 130 to make the buddy list call.

At step 404, the user device determines whether the request is approved or denied. For example, the service provider 130 sends a verification that the request is accepted, and at step 405, the service is provided using the buddy list. This may include allowing the user to make the call using the buddy list. For example, the call is made through the account of the user 111 held with the service provider 130. The account identifies the service and guidelines for use of the service. The guidelines may specify the fee for the service.

The user device may alternatively determine the request is denied at step 404. For example, the service provider 130 sends an indication that the request is denied, or after a predetermined time of no response from the service provider 130, it is assumed the request is denied. Upon determination the request is denied, steps 403-404 may be repeated for a next profile retrieved from the local list 304. For example, at step 406, the user device determines whether another profile that has not been tried is in the local list 304. If another profile is in the local list 304, then the profile is retrieved at step 407 and steps 403-404 are repeated for that profile. If the request is accepted, then the service is provided. If the request is denied, then the steps may be repeated for a next profile. If no more profiles are in the local list 304, then the user cannot use a buddy list to utilize the service.

FIG. 4B describes a method 450 on the server-side for using the buddy list. The method 450 may be performed in conjunction with the method 400. At step 451, the service provider receives a request to use a buddy list for a service. This may be the request generated at step 403.

At step 452, the service provider determines whether to accept the request. For example, the service provider 130 receives information from the user device 120 with the request at step 451. The information includes <ID><password><telephone number of user 121><telephone number of buddy list owner (user 111)>. The service provider 130 parses the request to identify the ID and password of the user 121, telephone number of the owner of the buddy list and a telephone number of the user 121. The service provider 130 validates the ID and password to determine the user 121 is registered to use the service through the buddy list. The service provider 130 validates the telephone number of the owner of the buddy list to determine the owner has a valid account with the service provider. The service provider 130 determines the user 121 has a sufficient reserve amount on the buddy list 112. If all these conditions are met then use of the buddy list may be approved. The service provider 130 sends a verification of approval to use the buddy list at step 453. Then, the user 121 may use the buddy list 112 to utilize the service at step 455. This may include making a call, and then the reserve amount for the user 121 is diminished based on the length of the call.

The service provider may determine not to approve the request at step 452. For example, the user 121 may not be on the buddy list 112 or the reserve amount may be 0 or an insufficient amount to use the service. Then, the service provider 130 sends an indication of denial of the request to the user 121 at step 454. Another reason the request may be denied is that the user 121 may not be registered with the service provider 130 as having the ability to use a buddy list.

The methods described herein may be applied to use buddy lists for a variety of services, such as cellular, SMS, Internet service and other services. One example of another type of service is STD/ISD telephone service. If for example an STD or ISD call is blocked, then a buddy list may be used to make the call.

Figure 4C:
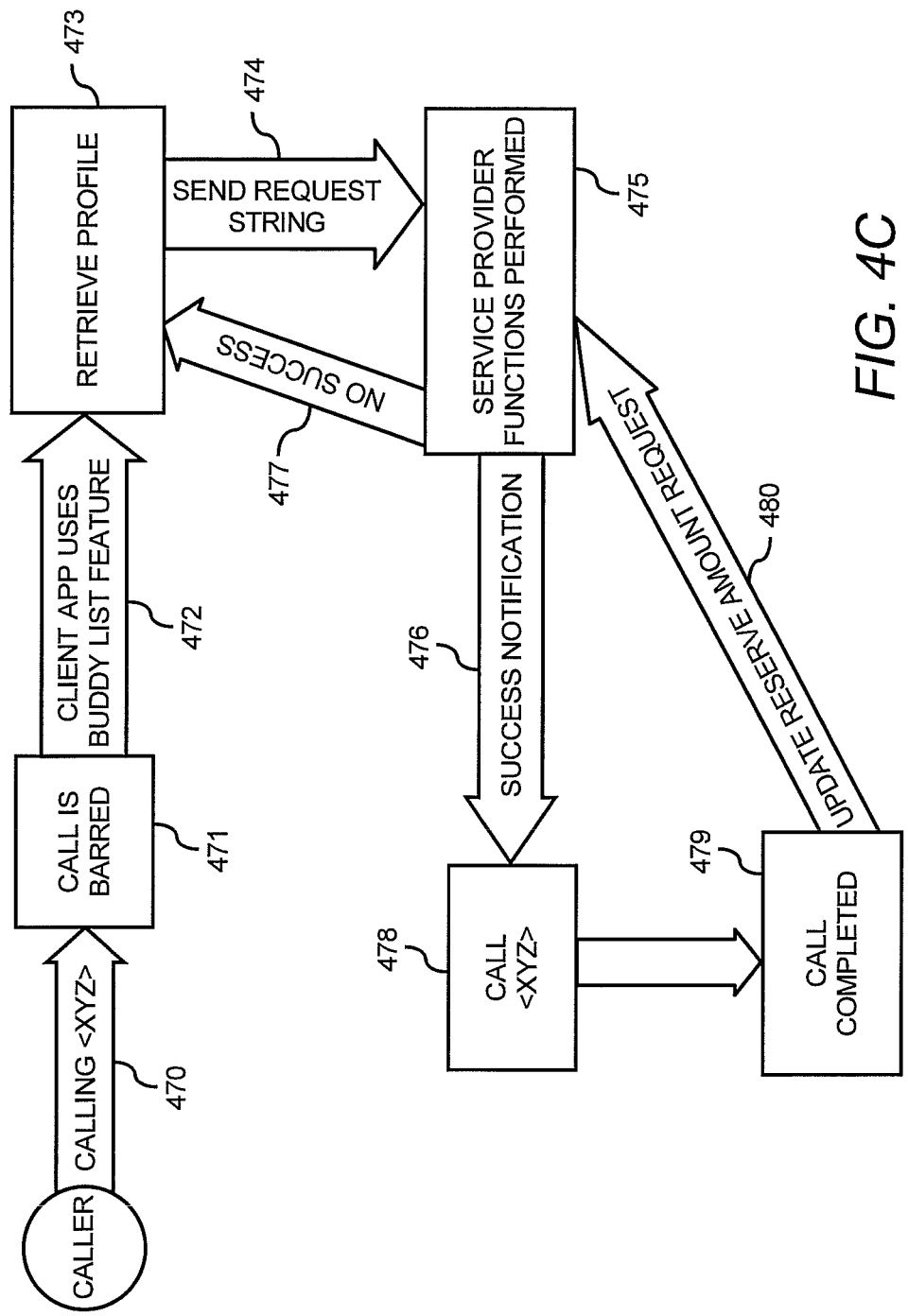

FIG. 4C is a flow diagram 470 summarizing the procedure of using the buddy list to make a call. Many of the steps shown in the summary flow diagram 470 are described with respect to methods 400 and 450. At 470, a caller calls <xyz>. xyz is the telephone number of the person being called.

At 471, the call is barred. This may be for a number of reasons, such as the call is barred based on restrictions for the caller's account, insufficient funds to make a call (e.g., cellular call or call at STD/ISD facility), or not being registered to the STD/ISD facility. At 472, the client application, such as the observer module 303 in the buddy list application 301 shown in FIG. 3, attempts to use the buddy list feature to make the call. The buddy list application 301 may be running in the background on the cell phone to invoke the buddy list feature.

At 473, the buddy list application 301 identifies a profile from the local list 304, and dials a string at 474 for the profile. The string is a request sent to the service provider to use the buddy list corresponding to the identified profile to make the call.

At 475, service provider functions are performed. The service provider receives the string, parses the string to identify the corresponding buddy list, and validates the buddy list account and the caller. If everyone is validated and the caller is on the buddy list and has a sufficient reserve amount, a success notification is sent to the caller at 476. Otherwise, a no success notification is sent at 477 to the caller or a timeout is reached where no success notification is received by the caller within a predetermined time of sending the request. Then, the process at 473 is repeated for a new profile assuming all the profiles in the local list have not been tried.

At 478, after receiving the success notification, the telephone number <xyz> is dialed by the caller or the buddy list application 301. At 479, the call is completed, and at 480 an update reserve amount request is sent to the service provider. The service provider updates the reserve amount on the buddy list, for example, based on the number of minutes used by the caller.

Figure 5:
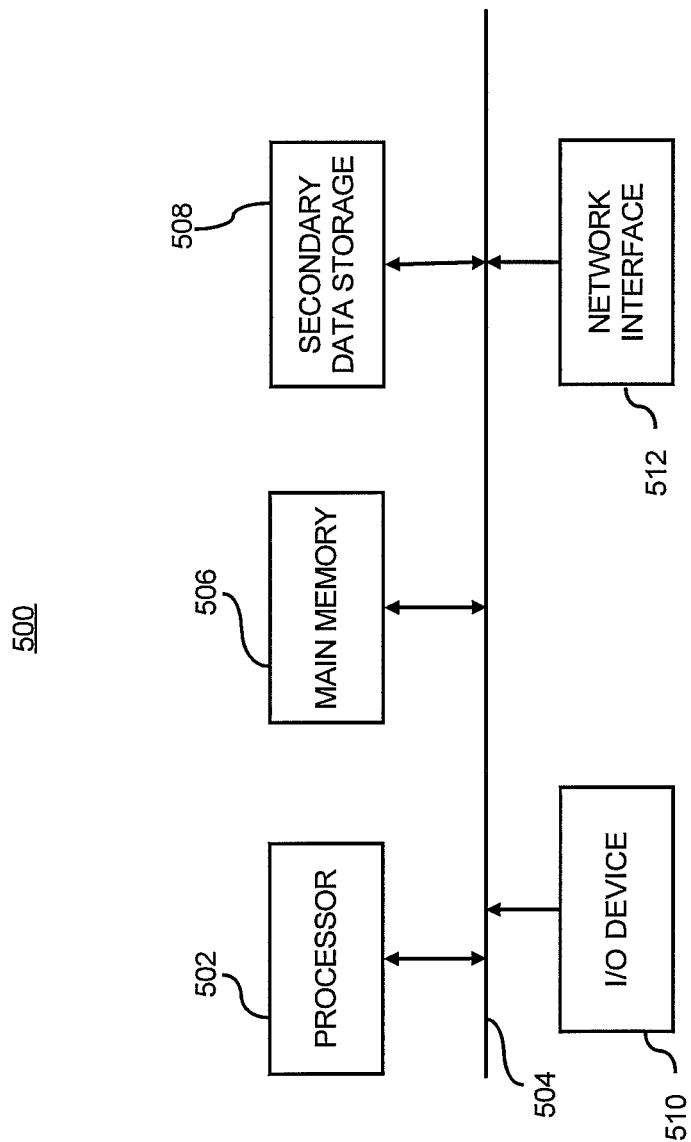
FIG. 5 illustrates a computer system operable to be used as a platform for one or more of the devices in the system shown in FIG. 1, according to an embodiment.

FIG. 5 shows a computer system 500 that may be used with the embodiments described herein. The computer system 500 represents a generic platform that includes components that may be in a user device or may be in a server for a service provider. The computer system 500 may be used as a platform for executing one or more of the methods, functions and other steps described herein.

The computer system 500 includes a processor 502 that may implement or execute software instructions performing some or all of the methods, functions and other steps described herein. Commands and data from the processor 502 are communicated over a communication bus 504. The computer system 500 also includes a main memory 506, such as a random access memory (RAM), where the software and data for processor 502 may reside during runtime, and a secondary data storage 508, which may be non-volatile and stores software and data. The memory and data storage are examples of computer readable mediums.

The computer system 500 may include one or more I/O devices 510, such as a keyboard, a mouse, a display, etc. The computer system 500 may include a network interface 512 for connecting to a network. It will be apparent to one of ordinary skill in the art that other known electronic components may be added or substituted in the computer system 500.

While the embodiments have been described with reference to examples, those skilled in the art will be able to make various modifications to the described embodiments without departing from the scope of the claimed embodiments.

What is claimed is:

1. A method of using a buddy list to utilize a service provided by a service provider, the method comprising:
   storing, on a first device of a first user, profiles of other users who have indicated to the service provider that the first user is allowed to utilize the service via an account of the respective other users, wherein each of the profiles identifies a different buddy list owned by one of the other users, wherein each of the buddy lists includes an identification of the first user as a buddy who may utilize the service via an account of the other user;

detecting, by the first device, that the first device is blocked from utilizing the service;

monitoring, by the first device, signal strength of a signal received by the first device from a cell tower;

determining, by the first device, whether the first device is blocked from utilizing the service due to lack of the signal strength;

in response to the determination that the first device is blocked from utilizing the service other than due to the lack of signal strength, retrieving, by the first device, a first profile from the stored profiles, wherein the first profile identifies a buddy list owned by another user who has listed the first user as a buddy to allow the first user to utilize the service via an account of the other user;

displaying the first profile as a selectable option on a menu on a display of the first device;

receiving, through a user interface on the first device, a selection of the first profile;

in response to the selection of the first profile, transmitting the first profile including an identifier (ID) and password of the first user, a telephone number of the other user and a telephone number of the first user, from the first device to a server of the service provider, as a request for use of the buddy list associated with the first profile to utilize the service that is currently blocked via the account of the other user;

if the request is denied, repeating by the first device the following until a request is approved or all of the stored profiles have been used in requests:
  retrieving another profile from the stored profiles;
  presenting the retrieved profile as a selectable option on the menu on the first device; receiving a selection of the retrieved profile; and
  requesting use of the buddy list associated with the retrieved profile to utilize the service that is currently blocked; and if the request is approved, using the service.

2. The method of claim 1, wherein if the request is approved, using the service further comprises:
  using the account of the other user associated with the approved request to use the service.

3. The method of claim 2, wherein the other user is charged for the use of the service by the first user.

4. The method of claim 1, wherein storing profiles further comprises:
  for each profile having an associated buddy list, sending a request to add the first user to the buddy list;
  receiving verification of the first user being added to the buddy list if the first user is approved to be added to the buddy list; and
  storing the profile, wherein the profile identifies the buddy list.

5. The method of claim 4, wherein the first user is added to the buddy list if an owner of the buddy list approves the first user to be added to the buddy list and if the service provider approves the first user to use the buddy list.

6. The method of claim 4, wherein each associated buddy list identifies the first user and a reserve amount for the first user, wherein the reserve amount indicates an amount of use of the service that is available to the first user, and the reserve amount is included in each stored profile.

7. The method of claim 4, wherein if the first user is not approved to be added to the buddy list, then registering the first user with a service provider of the service to facilitate approval of the first user being added to the buddy list.

8. The method of claim 1, further comprising:
  the service provider receiving the request;
  parsing the request to identify the ID and password of the first user, the telephone number of the other user and the telephone number of the first user;
  validating the ID and password to determine that the first user is registered to use the service through the buddy list;
  validating the telephone number of the other user to determine that the other user has a valid account with the service provider;
  determining the first user has a sufficient reserve amount on the buddy list; and
  making the service available to the first user.

9. The method of claim 8, further comprising:
  debiting the reserve amount on the buddy list based on an amount of the first user's use of the service.

10. The method of claim 8, further comprising:
  sending a notification to the other user indicating the first user's use of the service through the buddy list.

11. A user device configured to allow a first user to utilize a service provided by a service provider through a second user's account, the user device comprising:
  a storage device storing profiles of other users of the service who have indicated to the service provider that the first user is allowed to utilize the service via an account of the respective other users, each profile identifying a different buddy list of one of the other users of the service, wherein each of the buddy lists includes an identification of the first user as a buddy who may utilize the service via an account of the other user; and
  a processor to execute a registration module and an observer module, wherein the registration module is to register the first user on the buddy lists of the other users and a reserve amount for each buddy list, and the observer module is to
    detect that the user device is blocked from using the service;
    monitor a signal strength of a signal received by the first device from a cell tower;
    determine whether the first device is blocked from utilizing the service due to lack of the signal strength;
    in response to the determination that the user device is blocked from using the service other than due to the lack of signal strength, retrieve a first profile of the stored profiles, wherein the first profile identifies a buddy list owned by another user who has listed the first user as a buddy to allow the first user to utilize the service via an account of the other user;
    display the first profile as a selectable option on a menu on a display of the user device;
    receive, through a user interface on the user device, a selection of the first profile;
    transmit, from the user device to a server of the service provider, the first profile including an ID and password of the first user, a telephone number of the other user and a telephone number of the first user as a request for use of the buddy list associated with the first profile to utilize the service that is currently blocked via the account of the other user;
    if the request is denied, repeat the following until a request is approved or all of the stored profiles have been used in requests:
      retrieve another profile from the stored profiles;

display the retrieved profile as a selectable option on the menu on the user device; receive a selection of the retrieved profile; and request use of the buddy list associated with the retrieved profile to utilize the service that is currently blocked; and if the request is approved, utilize the service provided by the service provider.

12. The user device of claim 11, wherein each buddy list is owned by a different user of the cellular service, and the buddy list allows the first user to use a cellular account of the owner of the buddy list to make a call.

13. The user device of claim 12, wherein the reserve amount identifies the amount of use of the service the first user service is entitled to.

14. The user device of claim 13, wherein the first user is approved to use a buddy list if the first user registered with the service provider to use buddy lists.

15. At least one non-transitory computer readable medium storing computer instructions that when executed by one or more processors performs a method using a buddy list to utilize a service provided by a service provider, the method comprising:

storing, on a first device of a first user, profiles of other users of the service who have indicated to the service provider that the first user is allowed to utilize the service via an account of the respective other users, wherein each of the profiles identifies a different buddy list owned by one of the other users, wherein each of the buddy lists includes an identification of the first user as a buddy who may utilize the service via an account of the other user;

detecting that the first device is blocked from utilizing the service;

monitoring a signal strength of a signal received by the first device from a cell tower;

determining whether the first device is blocked from utilizing the service due to lack of the signal strength;

in response to the determination that the first device is blocked from utilizing the service other than due to the lack of signal strength, retrieving a first profile from the stored profiles, wherein the first profile identifies a buddy list owned by another user who has listed the first user as a buddy to allow the first user to utilize the service via an account of the other user;

displaying the first profile as a selectable option on the menu on a display of the first device;

receiving, through a user interface on the first device, a selection of the first profile;

transmitting the first profile including an ID and password of the first user, a telephone number of the other user and a telephone number of the first user, from the first device to a server of the service provider, as a request for use of the buddy list associated with the first profile to utilize the service that is currently blocked via the account of the other user;

if the request is denied, repeating the following until a request is approved or all of the stored profiles have been used in requests:

retrieving another profile from the stored profiles;

displaying the retrieved profile as a selectable option on the menu on the user device; receiving a selection of the retrieved profile; and requesting use of the buddy list associated with the retrieved profile to utilize the service that is currently blocked; and facilitating use of the service if the request is approved.

16. The at least one non-transitory computer readable medium of claim 15, wherein if the request is approved, using the service further comprises:

using the account of the other user associated with the approved request to use the service.

* * * * *